United States Patent [19]

Neiberger

[11] Patent Number: 5,026,572

[45] Date of Patent: Jun. 25, 1991

[54] JERKY-STYLE PET PRODUCTS

[75] Inventor: Denny W. Neiberger, Wayzata, Minn.

[73] Assignee: ConAgra Pet Products Company, Omaha, Nebr.

[21] Appl. No.: 604,339

[22] Filed: Oct. 24, 1990

Related U.S. Application Data

[63] Continuation of Ser. No. 336,044, Apr. 11, 1989, abandoned.

[51] Int. Cl.$^5$ ................................................ A23L 1/31
[52] U.S. Cl. .................................... 426/641; 426/513; 426/516; 426/523; 426/524; 426/634; 426/640; 426/646; 426/647; 426/805
[58] Field of Search ............... 426/641, 646, 647, 513, 426/516, 523, 524, 443, 805, 634, 640

[56] References Cited

U.S. PATENT DOCUMENTS

| | | | |
|---|---|---|---|
| 2,461,291 | 2/1949 | McKee | 426/264 |
| 2,521,849 | 9/1950 | Hopkins et al. | 426/264 |
| 3,432,311 | 3/1969 | Gruner | 426/264 |
| 4,225,630 | 9/1980 | Pitchon | 426/805 X |
| 4,239,785 | 12/1980 | Roth | 426/517 |
| 4,276,311 | 6/1981 | Rose | 426/805 X |
| 4,343,821 | 8/1982 | Rose | 426/641 X |
| 4,384,009 | 5/1983 | Lewis et al. | 426/646 |
| 4,419,372 | 12/1983 | Greene et al. | 426/657 |
| 4,702,929 | 10/1987 | Lehn et al. | 426/646 |

Primary Examiner—R. B. Penland
Attorney, Agent, or Firm—Willian Brinks Olds Hofer Gilson & Lione

[57] ABSTRACT

A method of making a jerky-type product is provided which uses multiple extrusion steps. First, a blend of a wet beef product and a high protein flour are mixed and then cooked by extruding the first blend at a temperature sufficient to at least partially cook the beef in the first blend. Next, a second blend is formed which includes the extruded product of the first extrusion step and additional wet beef. The second blend is then cooked by extruding the second blend at a temperature sufficient to cook the wet beef in the second blend. Finally, the material from the second blend is processed into jerky form.

26 Claims, No Drawings

JERKY-STYLE PET PRODUCTS

This application is a continuation of application Ser. No. 07/336,044, filed Apr. 11, 1989, abandoned.

BACKGROUND OF THE INVENTION

This invention relates generally to a method of making or manufacturing a jerky-type food product and more particularly to a method of manufacturing a jerky-type product for pets, which method provides a high yield from the original meat products used in the process.

Jerky-type food products, particularly jerky-type food products for pets, have become increasing popular. Jerky-type pet products provide a food product which may be flavored to enhance its appeal to the pet and which provides a source of nutrients for the pet. The jerky-type pet product may be used as a snack or a treat for the pet.

Jerky-type pet products are typically manufactured from a beef product particularly a beef waste product. The product may include other meat such as poultry, particularly in the form of poultry meal, and other products may be used as extenders. For example, soybeans may be used to enhance the protein content of the finished jerky-type pet food product.

Presently, jerky-type pet treats are manufactured by grinding frozen 3D beef and beef lungs and combining the ground product with a small quantity of fat and a small quantity of wheat (approximately 10%), a flavoring blend of spices and artificial smoke flavor. The amount of fat added is typically adjusted according to the fat content of the 3D beef and beef lungs (typically about 8%). The mixture which results is then forced through a forming dye typically by "V-Mag" type of pump. The shaped product is then cut to a predetermined length and placed on cooking racks which are constructed of expanded metal trays. The formed blend, which contains approximately 62% moisture is then "cooked" in a convection type low temperature oven for approximately four hours. Although this process results in a suitable finished product, the yield from this process is only approximately 45%.

Another method of making jerky is disclosed in U.S. Pat. No. 4,239,785 (Roth). This patent discloses a method wherein the material for making the jerky is first ground to a desired consistency and blended with selected curing agents or seasoning. The cured or seasoned material is then extruded on to a freezer drum and compressed on the drum to chill or freeze the material and to form the desired thickness of the jerky on the drum. The frozen jerky is then removed from the freezer drum, cut to desired lengths and deposited on a conveyor. The conveyor then passes the length through a hot air tunnel to thaw out the jerky strips. The heating of the jerky strips is continued until the moisture is removed therefrom. This process suffers from the same disadvantages as the process described above. The blended product must be dried to remove a sufficient amount of moisture to form the final jerky product. This moisture removal process reduces the yield of the process.

U.S. Pat. No. 4,384,009 (Lewis et al.) discloses a method of manufacturing dehydrated meat products. In the method disclosed in this patent, raw meat pieces are intimately mixed with vegetable materials to form a stiff cohesive mixture. One or more substances such as salt or salt in combination with dextrose, sucrose, fructose or hydrolysed plant proteins are added to reduce or control the water activity in the final product. After the materials have been mixed, the mixture is formed into a sheet or an extrusion and dried to produce an intermediate moisture product.

Other methods of manufacturing pet type treat products are disclosed in U.S. Pat. No. 4,419,372 (Greene et al.) and U.S. Pat. No. 4,702,929 (Lehn et al.).

Therefore in view of the above, it is a primary object of the present invention to provide a process for producing a jerky-type product, which process will result in a high yield.

It is a further object of the present invention to provide a method for making jerky-type products with a high protein content.

It is a further object of the present invention to provide a method of making or manufacturing jerky-type products with a high meat content.

It is still a further object of the present invention to provide a method of making or manufacturing jerky-type products in a relatively quick period of time compared to presently available methods.

SUMMARY OF THE INVENTION

To achieve the foregoing and other objects and in accordance with the purposes of the present invention, a method of making jerky-type product includes the at least two successive steps of blending a mixture of materials including wet beef products and cooking the mixture by extruding the mixture at a temperature sufficient to at least partially cook the wet beef in the mixture and then processing the extruded the mixture into jerky form. In a first step, a first blend is formed by mixing a wet beef product and a flour. The first blend is cooked by extruding the blend at a temperature sufficient to at least partially cook the beef in the first blend. Next, the product from the first extrusion is mixed with additional wet beef to form a second blend. The second blend is then cooked by extruding it at a temperature sufficient to cook the wet beef in the second blend. Finally, the product from the second extrusion is processed to form the jerky-type product.

In a preferred embodiment, the product from the second extrusion is processed into jerky-type form by mixing it with a meat binder to form a third blend. The third blend is then extruded and the product from this third extrusion is shaped into the desired jerky form. Finally the shaped product is cooled to ambient temperature.

Additional objects, advantages and novel features of the invention will be set forth in part in the description which follows and in part will become apparent to those skilled in the art upon examination of the following or may be learned by practice of the invention. The objects and advantages of the invention may be obtained by means of the combinations particularly pointed out in the appended claims.

DETAILED DESCRIPTION OF THE PRESENTLY PREFERRED EMBODIMENTS

In a preferred embodiment of the present invention, the processing of beef into a jerky-type product is accomplished in a three-step process. Preferably the first step of the process comprises blending or mixing a variety of ingredients including beef, preferably in the form of wet beef waste, and flour. The other ingredients for this step include preservatives and salt. The flour is preferably a high protein flour such as soybean flour. Soybean flour includes a protein content of about 48%, and a "high" protein flour is defined herein a a flour having a protein content around this 48% value. Any suitable preservatives such as potassium sorbate and potassium chloride may be used.

Other materials may also be added to increase the protein content of the finished product. For example, poultry meal which is very high in protein may be included as part of the mixture of the first step. Poultry meal comprises materials produced by a rendering process utilizing primarily chicken and turkey back, necks, and offal. Spray dried (S/D) blood meal may also be added to increase the protein content of the final jerky-type product.

Fillers may also be added to increase the economy of the process. A suitable filler comprises a bakery blend (the waste product from commercial bakeries). Bakery blend is a suitable filler which can be inexpensively purchased.

A preferred combination or mixture of materials for the first blend is as follows:

| Wet Beef Waste | 30.00% |
|---|---|
| Poultry Meal | 35.00% |
| Soy Flour | 15.00% |
| Bakery Blend | 15.00% |
| S/D Blood Meal | 2.00% |
| Potassium Sorbate | .50% |
| Potassium Chloride | .50% |
| Salt | 2.00% |

Next, a blend is prepared from the above-described materials by mixing these materials, for example, using a standard paddle mixer until they are completely blended. After the blend has been completely mixed, the mixture is extruded at a barrel temperature sufficient to at least partially cook the wet beef waste in the mixture. Preferably the barrel temperature is in a temperature range from about 260° F. to about 280° F. A preferred temperature for the barrel temperature has been found to be 270° F. A suitable extruder is available from Insta-Pro (Des Moines, Iowa) as the Insta-Pro Dry Extruder model No. 2000R. The resulting mixture from the first extrusion process results in a "flour-like" material. (No attempt is made after the first extrusion step to form the product into any particular shape.)

The flour-like product produced from the first extrusion step is then combined with other materials to form a second mixture. An additional amount of wet beef waste is added in this step to increase the meat content of the final jerky product. Preferably a binder having a high starch content is also added in this step. Suitable binders are known in the art and include wheat, corn, etc. A preferred combination of materials for this second blend is as follows:

| First Run Product | 60% |
|---|---|
| Wet Beef Waste | 25% |
| Wheat | 15% |

This mixture is then thoroughly blended, for example, in a standard paddle mixer. After this second combination of materials has been mixed, the blend is extruded in the single screw type extruder. Preferably, the barrel temperature for this second extrusion step is in a range of from about 240° F. to about 270° F. This temperature range is sufficient to at least partially cook and preferably fully cook the wet beef waste which has been added during the second mixing step. A preferred barrel temperature has been found to be approximately 250° F. The product which results from this second extrusion step is still a flour-like material.

The temperature ranges of the first and second extrusion steps are also sufficiently high such that undesirable microorganisms in the meat are eliminated to an acceptable level.

The extruded material from the second extrusion step is then formed into the conventional jerky form by a suitable process. For example, the flour-like material from the second step may be wetted and poured into a mold having the desired form and then baked until the jerky-type product has been produced.

More preferably, the step of forming the material from the second extrusion step into the jerky-type material comprises the step of blending the product from the second extrusion step with a binder and then extruding the blend through an extruder, for example a single screw extruder, using a barrel temperature in a range from about 160° F. to about 180° F. A preferred temperature has been found to be approximately 170° F. A suitable commercial binder is available commercially as CMC.

In this last step other materials which may be used to enhance the taste of the jerky-type product may also be added. Such materials may include liquid smoke to impart a smoke-like flavor and miscellaneous spices such as garlic, onion, salt, etc.

Preferably a small amount of propylene glycol is also added during the mixing process in this step. The propylene glycol functions as an extrusion lubricant in this final extrusion step.

The resultant product from this third extrusion step is then shaped for example, by feeding the product to a multi-cavity flaking roller. The flaking roller shapes the extruded mixture into the desired form. The material is then preferably convection cooled to ambient temperature for packaging. The losses associated with the conventional methods of making the jerky-type product by drying the meat in a convection-type oven are eliminated.

Because of the high moisture content of wet beef waste (up to 62%) it is not possible to produce a high meat content product using a single extrusion step. In the first step of the process of the present invention, a sufficient amount of meat (as disclosed above) is included to permit the extrusion machine to function properly. However, the meat content is not at the desired level for the final product. It would not be possible to extrude a mixture having a high percentage of meat in this first step since the high moisture content of the meat would prevent the extruder from developing the pressures necessary for the extrusion process. Therefore, the second step of the extrusion process is necessary to provide a finished jerky-type product with the desired high meat content. The second step raises the meat concentration by adding a second portion of wet beef waste to the extruded mixture from the first extrusion step.

The flour-like material from the second extrusion step not only has a high meat concentration, but the wet beef is fully cooked after the second extrusion step. This provides additional advantages.

Thus, the process of the present invention has several significant advantages over conventional methods of jerky-type pet products. Since the meat products used in jerky making processes are typically ground at the beginning of the process, a large amount of the intercellular moisture and fat are released from the meat product. After the meat products are processed they are finally heated to form the jerky-type product by removing the moisture content from the meat product. This moisture removal results in a very low yield from the initial weight of the meat product. Meat may contain up to 62% moisture and therefore if this moisture is removed, the resulting yield from the process is low. As stated above, the final yield from conventional cooking methods is only approximately 45%.

In contrast, the method of the present invention the has a yield of approximately 85.5%. The yield from the first run or step of this method is approximately 90%. The yield from the second run is approximately 95%. If the forming process is accomplished by the third extrusion step, the yield from this third step is approximately 100%. Therefore, the yield from the initial product using the method of the present invention is substantially higher than the yield from available methods. This increased yield thus results in a substantial economic advantage.

Even if the method of forming the jerky-type product is accomplished by wetting and shaping the flour-like material from the second extrusion step and then baking the material, a higher yield is accomplished than by using known methods. Since the meat has been fully cooked after the second extrusion step, the moisture which is driven off by the baking process is the moisture which is added during the wetting process and not the intercellular moisture of the meat. The meat is already fully cooked and the intercellular moisture removed by the baking process is substantially reduced. Therefore, even if a baking process is used to form the product from the second extrusion step into a jerky-type product, the yield from the original meat product is greater than the yield using conventional methods. This increased yield arised because the moisture lost in the baking process is from the wetting process and not from the intercellular moisture originally in the meat.

A substantial reduction in the time necessary to produce the product is also accomplished using the method of the present invention. Since the meat is cooked in the extrusion process, there is no need to cook the meat using other conventional techniques. Since the use of a conventional heater type oven is not required, the energy consumption required for the process is reduced. Because the production is not slowed by time in the oven, the production process of the present invention has a through-put which is at a minimum doubled from conventional processes.

Therefore, the process of the present invention provides a method for making jerky-type products, particularly pet jerky-type products, which have a high meat content. The method results in a high yield from the original meat product used in the process and reduces the amount of energy and time necessary to make the jerky-type product.

The foregoing description of the preferred embodiments of the present invention has been presented for purposes of illustration and description. They are not intended to be exhaustive or to limit the invention to the precise forms disclosed and obviously many modifications and variations are possible in light of the above teachings. The embodiments were chosen and described in order to best explain the principles of the invention and its practical applications to thereby enable others skilled in the art to best utilize the invention in various embodiments and with various modifications as are suited to the particular use contemplated. It is intended that the scope of the invention be defined by the following claims including al equivalents.

I claim:

1. A method of making a food product comprising the steps of:
   forming a first blend, the first blend including a wet beef product and a flour;
   extruding the first blend at a first extrusion temperature in a temperature range of from about 260° F. to about 280° F. to form a first run product;
   forming a second blend, the second blend including the first run product and a wet beef product;
   extruding the second blend at a temperature second extrusion temperature in a range of from about 240° F. to about 275° F. to form a second run product; and
   processing the second run product into jerky.

2. The method of claim 1 wherein the step of processing the second run product into jerky comprises:
   forming a third blend, the third blend including the extruded second blend and meat binder;
   extruding the third blend at a third extrusion temperature in a range of from about 160° F. to about 180° F. to form a third run product;
   shaping the third run product into a desired shape; and
   cooling the shaped third run product to ambient temperature.

3. The method of claim 1 wherein the wet beef comprises wet beef waste.

4. The method of claim 3 wherein the flour comprises a high protein flour.

5. The method of claim 4 wherein the high protein flour comprises soybean flour.

6. The method of claim 5 wherein the first blend further includes poultry meal.

7. The method of claim 5 wherein the first blend comprises the following mixture:

| Wet Beef Waste | 30.00% |
| Poultry Meal | 35.00% |
| Soy Bean Flour | 15.00% |
| Bakery Blend | 15.00% |
| [S/D] Blood Meal | 2.00% |
| Potassium Sorbate | .50% |
| Potassium Chloride | .50% |
| Salt | 2.00% |

8. The method of claim 7 wherein the second blend comprises the following mixture:

| First Run Product | 60% |
| Wet Beef Waste | 25% |
| Binder | 15% |

9. The method of claim 7 wherein the third blend comprises the following mixture:

| Second Run Product | 94.00% |
| Propylene Glycol | 4.00% |
| Liquid Smoke | 1.00% |
| Binder | 0.10% |

| | |
|---|---|
| Spices | 0.90% |

10. The method of claim 3 wherein the first extrusion temperature is approximately 270° F.; the second extrusion temperature is approximately 250° F.; and the third extrusion temperature is approximately 170° F.

11. The method of claim 1 wherein the steps of extruding the first and second blends comprise extruding the first and second blends in a single screw extruder.

12. The method of making a food product comprising the steps of:
forming a first blend, the first blend including a wet beef product and a flour;
at least partially cooking the wet beef in the first blend comprising extruding the first blend at a temperature sufficient to at least partially cook the wet beef in the first blend to form a first run product;
forming a second blend, the second blend including the first run product and wet beef;
cooking the wet beef in the second blend comprising extruding the second blend at a temperature sufficient to cook the wet beef in the second blend to form a second run product; and
processing the second run product into jerky.

13. The method of claim 12 wherein the step of processing the second run product into jerky comprises:
forming a third blend, the third blend including the second run product and a meat binder;
cooking the third blend comprising extruding the third blend at a third extrusion temperature to form a third run product;
shaping the third run product into a desire shape; and
cooling the shaped third run product to ambient temperature.

14. The method of claim 12 wherein the wet beef comprises wet beef waste.

15. The method of claim 14 wherein the flour comprises a high protein flour.

16. The method of claim 15 wherein the high protein flour comprises soy bean flour.

17. The method of claim 16 wherein the first blend further includes poultry meal.

18. The method of claim 16 wherein the first blend comprises the following mixture:

| | |
|---|---|
| Wet Beef Waste | 30.00% |
| Poultry Meal | 35.00% |
| Soy Bean Flour | 15.00% |
| Bakery Blend | 15.00% |

19. The method of claim 18 wherein the second blend comprises the following mixture:

| | |
|---|---|
| First Run Product | 60% |
| Wet Beef Waste | 25% |
| Binder | 15% |

20. The method of claim 19 wherein the third blend comprises the following mixture:

| | |
|---|---|
| Second Run Product | 94.00% |
| Propylene Glycol | 4.00% |
| Liquid Smoke | 1.00% |
| Binder | 0.10% |
| Spices | 0.90% |

21. The method of claim 14 wherein the first extrusion temperature is approximately 270° F.; and the third extrusion temperature is approximately 170° F.

22. A method of making a food product comprising the steps of:
forming a first blend, the first blend including a wet beef product and a high protein flour;
extruding the first blend at a temperature in a temperature range of from about 260° F. to about 280° F. to form a first run product;
forming a second blend, the second blend including the first run product and a wet beef product;
extruding the second blend at a temperature in a range of from about 240° F. to about 275° F. to form a second run product;
forming a third blend, the third blend including the second run product and a meat binder;
extruding the third blend at a temperature in a range of from about 160° F. to about 180° F. to form a third run product;
shaping the third run product into a desired shape; and
cooling the shaped third run product to ambient temperature.

23. The method of claim 22 wherein the wet beef comprises wet beef waste.

24. The method of claim 23 wherein the high protein flour comprises soy bean flour.

25. The method of claim 24 wherein the first blend further includes poultry meal.

26. The method of claim 25 wherein:
(a) the first blend comprising the following mixture:

| | |
|---|---|
| Wet Beef Waste | 30.00% |
| Poultry Meal | 35.00% |
| Soy Bean Flour | 15.00% |
| Bakery Blend | 15.00% |
| [S/D] Blood Meal | 2.00% |
| Potassium Sorbate | .50% |
| Potassium Chloride | .50% |
| Salt | 2.00% |

(b) the second blend comprises the following mixture:

| | |
|---|---|
| First Run Product | 60% |
| Wet Beef Waste | 25% |
| Binder | 15% | and
(c) the third blend comprises the following mixture:

| | |
|---|---|
| Second Run Product | 94.00% |
| Propylene Glycol | 4.00% |
| Liquid Smoke | 1.00% |
| Binder | 0.10% |
| Spices | 0.90% |

\* \* \* \* \*

UNITED STATES PATENT AND TRADEMARK OFFICE
CERTIFICATE OF CORRECTION

PATENT NO. : 5,026,572

DATED : June 25, 1991

INVENTOR(S) : Denny W. Neiberger

It is certified that error appears in the above-identified patent and that said Letters Patent is hereby corrected as shown below:

In column 1, line 15, please delete "increasing" and substitute therefor --increasingly--.

In column 2, line 33, before "mixture" please delete "the".

In column 2, line 49, after "Finally" please insert --,--.

In column 3, line 3, please delete the second occurrence of "a" and substitute therefor --all--.

In column 5, line 14, after "invention" please delete "the".

In column 5, line 40, please delete "arised" and substitute therefor --arose--.

In column 6, line 6, please delete "al" and substitute therefor --all--.

UNITED STATES PATENT AND TRADEMARK OFFICE
CERTIFICATE OF CORRECTION

PATENT NO. : 5,026,572
DATED : June 25, 1991
INVENTOR(S) : Denny W. Neiberger It is certified that error appears in the above-identified patent and that said Letters Patent is hereby corrected as shown below:

Col. 6; In claim 1, line 10, please delete "temperature".
Col. 7; In claim 13, line 8, please delete "desire" and substitute therefor --desired--.

In claim 18, in the table, in the lines following

"Bakery Blend        15.00%"

please insert

| | |
|---|---|
| --[S/D] Blood Meal | 2.00% |
| Potassium Sorbate | .50% |
| Potassium Chloride | .50% |
| Salt | 2.00%--. |

In claim 21, line 2, after "270°F.;" please insert --the second extrusion temperature is approximately 250°F.;--

Signed and Sealed this

Ninth Day of February, 1993

*Attest:*

STEPHEN G. KUNIN

*Attesting Officer*     *Acting Commissioner of Patents and Trademarks*